United States Patent
Yamamoto

(10) Patent No.: US 11,286,679 B2
(45) Date of Patent: Mar. 29, 2022

(54) REPAIR SEAL, METHOD FOR MANUFACTURING REPAIR SEAL, AND REPAIR STRUCTURE

(71) Applicant: Nichiha Corporation, Nagoya (JP)

(72) Inventor: Hiroaki Yamamoto, Nagoya (JP)

(73) Assignee: NICHIHA CORPORATION, Nagoya (JP)

( * ) Notice: Subject to any disclaimer, the term of this patent is extended or adjusted under 35 U.S.C. 154(b) by 0 days.

(21) Appl. No.: 15/930,730

(22) Filed: May 13, 2020

(65) Prior Publication Data
US 2020/0270883 A1 Aug. 27, 2020

Related U.S. Application Data

(63) Continuation of application No. PCT/JP2018/042191, filed on Nov. 14, 2018.

(30) Foreign Application Priority Data

Nov. 14, 2017 (JP) .............................. JP2017-218715

(51) Int. Cl.
E04G 23/02 (2006.01)
B32B 7/04 (2019.01)

(52) U.S. Cl.
CPC ............ *E04G 23/0207* (2013.01); *B32B 7/04* (2013.01); *B32B 2307/402* (2013.01);
(Continued)

(58) Field of Classification Search
CPC ................ B32B 7/04; B32B 2307/402; B32B 2307/412; B32B 2307/414; B32B 2379/08; B32B 2556/00
See application file for complete search history.

(56) References Cited

U.S. PATENT DOCUMENTS 4,661,182 A * 4/1987 Lerner .................... B29C 73/10
156/247
6,607,621 B1 8/2003 Swanson
(Continued)

FOREIGN PATENT DOCUMENTS

JP 10-220033 A 8/1998
JP 3057145 U 3/1999
(Continued)

OTHER PUBLICATIONS

International Search Report, issued in PCT/JP2018/042191, dated Dec. 25, 2018.

*Primary Examiner* — Jeffry H Aftergut
(74) *Attorney, Agent, or Firm* — Birch, Stewart, Kolasch & Birch, LLP

(57) ABSTRACT

A repair seal that is resistant to cracking and peeling during an attachment procedure and that is not noticeable after repair is provided. In addition, this repair seal is manufactured. Furthermore, a repair structure that is resistant to cracking and peeling during an attachment procedure and that is not noticeable after repair is provided. A repair seal 7 or 8 of the present invention is used for a decorative panel 1 including at least one undercoat layer 1b or 1c, a colored layer 1d, and a clear layer 1e stacked in this order on a substrate 1a. The repair seal 7 or 8 includes a repair multilayer body 70 and an adhesive layer 71. The repair multilayer body 70 includes a transparent or translucent resin base material sheet 70a, a repair colored layer 70b disposed on a front surface of the base material sheet 70a and formed from the same paint as the colored layer 1d, and a repair clear layer 70c formed from the same paint as the clear layer 1e. The adhesive layer 71 is disposed on a back surface of the base material sheet 70a and is transparent or translucent.

13 Claims, 6 Drawing Sheets

(52) U.S. Cl.
CPC ... *B32B 2307/412* (2013.01); *B32B 2307/414* (2013.01); *B32B 2379/08* (2013.01); *B32B 2556/00* (2013.01)

(56) References Cited

U.S. PATENT DOCUMENTS

2007/0116903 A1\* 5/2007 Song .................. B32B 27/06
428/31
2019/0112507 A1\* 4/2019 Inagaki .................. C09J 7/29

FOREIGN PATENT DOCUMENTS

| | | |
|---|---|---|
| JP | 3065868 U | 2/2000 |
| JP | 2005-68809 A | 3/2005 |
| JP | 2005-105257 A | 4/2005 |
| JP | 2006-200310 A | 8/2006 |
| JP | 2009-196173 A | 9/2009 |
| JP | 2011-251450 A | 12/2011 |
| JP | 2013-22836 A | 2/2013 |
| JP | 2013-23933 A | 2/2013 |
| JP | 2014-25271 A | 2/2014 |
| WO | WO 2009/120547 A2 | 10/2009 |

\* cited by examiner

REPAIR SEAL, METHOD FOR MANUFACTURING REPAIR SEAL, AND REPAIR STRUCTURE

CROSS REFERENCE TO RELATED APPLICATIONS

This application is a Continuation of PCT International Application No. PCT/JP2018/042191, filed on Nov. 14, 2018, which claims priority under 35 U.S.C. 119(e) to Patent Application No. 2017-218715, filed in Japan on Nov. 14, 2017, all of which are hereby expressly incorporated by reference into the present application.

TECHNICAL FIELD

The present invention relates to repair seals for building materials, methods for manufacturing repair seals, and repair structures.

BACKGROUND ART

PTL 1 discloses a repair seal that is used for a decorative panel. The decorative panel includes an undercoat layer, a colored layer (topcoat layer), and a clear layer (coat layer) stacked in this order on a substrate. The repair seal has a repair coating body formed on a surface of a release sheet (sheet) using the same paints as for the decorative panel so as to have the same coating configuration as the decorative panel. When the decorative panel is formed, the release sheet is attached to the substrate and is coated together to form the repair coating body. Thus, the repair coating body includes an undercoat layer, a colored layer, and a clear layer stacked in this order. This repair seal has a good appearance without a color difference after repair.

PTL 2 discloses a decorative sheet including a decorative pattern layer corresponding to a colored layer, an anchor coat layer corresponding to a clear layer, and a surface protective layer stacked in order on a surface of a base material sheet containing a pigment for hiding the color of a decorative panel (adherend).

PTL 3 discloses the following repair method. This repair method includes first preparing, when applying a multicolor pattern coating, a patch film including a colored layer (a base layer and a multicolor pattern layer) and a clear layer formed in order on a release sheet using the same paints as for the multicolor pattern coating so as to have the same configuration as the multicolor pattern coating, cutting the patch film to a size slightly larger than a missing area of the multicolor pattern coating, and bonding the patch film with the release sheet removed therefrom.

CITATION LIST

Patent Literature

PTL 1: Japanese Unexamined Patent Application Publication No. 2014-25271
PTL 2: Japanese Unexamined Patent Application Publication No. 2013-22836
PTL 3: Japanese Unexamined Patent Application Publication No. 10-22003.

SUMMARY OF INVENTION

Technical Problem

However, the repair coating body of the repair seal in PTL 1 tends to have poor flexibility because the repair coating body has the same coating configuration as the decorative panel. Therefore, when there is a recess, such as a screw hole, from which at least a clear layer has been removed in a surface of a decorative panel, and the recess is repaired by removing the release sheet from the repair seal and attaching the repair coating body to the clear layer of the decorative panel, the repair coating body cracks easily during the attachment procedure, and the cracked portion of the repair coating body may peel. In particular, when there is a screw hole in the decorative panel and the screw hole is repaired, an empty space remains between the repair coating body and the screw head within the screw hole at a position where there is no putty or an insufficient amount of putty. Thus, the repair coating body may crack due to the strain generated therein, and a portion of the repair coating body that is not in contact with putty or other material may peel.

The decorative sheet in PTL 2, which is not intended to provide the same coating configuration as a colored layer (topcoat layer) and a coat layer of a decorative panel, is difficult to use as a repair seal because color matching is difficult and the edges of the hiding base material sheet and the colored layer may be noticeable when obliquely observed.

For the patch film in PTL 3, the base color differs from the color of the decorative pattern layer. Therefore, when the portion repaired with the patch film bonded to the missing area of the decorative pattern coating is viewed, the edges of the cut surfaces of the patch film may be noticeable, particularly when obliquely observed.

The present invention has been made in view of the foregoing circumstances in the conventional art. An object to be achieved is to provide a repair seal that is resistant to cracking and peeling during an attachment procedure and that is not noticeable after repair. Another object to be achieved is to provide a repair structure that is resistant to cracking and peeling during an attachment procedure and that is not noticeable after repair.

Solution to Problem

A repair seal of a first aspect of the present invention is a repair seal that is used for a decorative panel including at least one undercoat layer, a colored layer, and a clear layer stacked in this order on a substrate. The repair seal includes a repair multilayer body including a transparent or translucent resin base material sheet, a repair colored layer disposed on a front side of the base material sheet and formed from the same paint as the colored layer, and a repair clear layer disposed on a front side of the repair colored layer and formed from the same paint as the clear layer; and a transparent or translucent adhesive layer disposed on a back side of the base material sheet.

Because the repair multilayer body of the repair seal of the first aspect includes the base material sheet, the repair colored layer, and the repair clear layer but does not include a coating similar to the undercoat layer of the decorative panel, the repair multilayer body is relatively thin. In addition, because the repair multilayer body includes the resin base material sheet, the repair multilayer body is flexible. Thus, the repair multilayer body is resistant to cracking during the procedure of repairing the surface of the decorative panel, and the repair seal is resistant to peeling from the decorative panel.

In addition, because the base material sheet of this repair seal is transparent or translucent, and the adhesive layer is also transparent or translucent, the colors of the base material sheet and the adhesive layer are not easily visible at the edges of the side surfaces of the repair multilayer body. In particular, because the colored layer of the decorative panel is visible through the base material sheet and the adhesive layer when obliquely observed, the repaired area is not noticeable.

Thus, the repair seal of the first aspect is resistant to cracking and peeling during an attachment procedure and is not noticeable after repair.

"The same paint" means the same composition and does not mean exactly the same color as the decorative panel to which the repair seal is to be actually attached.

That is, it is possible to use the paint for the decorative panel without any modification or, by taking into account a change in the color of the decorative panel due to aging, to use a paint whose color is finely adjusted to match the color after aging.

As a second aspect of the present invention, the base material sheet is preferably formed of an aromatic polyimide. In this case, the repair seal exhibits high thermal resistance and also exhibits excellent dimensional stability. In addition, because the resin seal has high chemical resistance and allows the use of solvent-based paints, the repair seal is resistant to dissolution and crease formation. Furthermore, the base material sheet of the repair seal after manufacture is resistant to deformation and crease formation when dried with intense heat. The repair seal also exhibits good adhesion between the base material sheet and the repair colored layer.

As a third aspect of the present invention, the repair seal preferably includes a primer layer that is disposed between the base material sheet and the repair colored layer and that is transparent, translucent, or of the same color as the repair colored layer. In this case, the adhesion between the base material sheet and the repair colored layer can be easily improved.

As a fourth aspect of the present invention, the decorative panel preferably has a high-gloss, mirror-like flat surface. In this case, there is a high need for repair using the repair seal, and the repaired area is less noticeable after repair.

A method of a fifth aspect of the present invention for manufacturing a repair seal is a method for manufacturing a repair seal that is used for a decorative panel including at least one undercoat layer, a colored layer, and a clear layer stacked in this order on a substrate. The method is composed of a first providing step of providing an intermediate sheet including a transparent or translucent resin base material sheet, a transparent or translucent adhesive layer disposed on a back side of the base material sheet, and a release sheet disposed on a back side of the adhesive layer; a second providing step of providing a base panel having the same surface properties as the substrate having the undercoat layer formed thereon; placing the intermediate sheet with the release sheet facing a front side of the base panel; and a coating step of applying the same paint as for the colored layer to the base material sheet to form a repair colored layer and then applying the same paint as for the clear layer to form a repair clear layer.

By the method of manufacture of the fifth aspect, a repair seal member can be easily manufactured. More specifically, because the repair seal is manufactured using the same paints as for the colored layer and the clear layer of the decorative panel in this method of manufacture, the colored layer and the repair colored layer are of the same color, and the clear layer and the repair clear layer are of the same color. In addition, because the repair seal is manufactured by placing the intermediate sheet on the base panel with the release sheet facing the front side of the base panel in this method of manufacture, the repair seal has a pattern similar to the surface profile of the decorative panel. In addition, this method of manufacture is particularly suitable for coating in contact with the material to be coated, as in the case of roll coater coating of a decorative panel.

The release sheet is not limited as long as the release sheet is formed of a material that can be removed from the adhesive layer and that does not exhibit an abnormal condition in terms of shape or size, such as shrinkage or warpage, during the process of manufacturing the repair seal.

The base panel has the same surface properties as the substrate having the undercoat layer formed thereon. As this base panel, it is possible to use, for example, a first panel including an undercoat layer on a substrate, a second panel including an undercoat layer and a colored layer stacked on a substrate and having the same surface properties as the first panel, or a decorative panel including an undercoat layer, a colored layer, and a clear layer stacked on a substrate and having the same surface properties as the first and second panels.

As a method of a sixth aspect of the present invention for manufacturing a repair seal, the base panel is preferably the decorative panel. This decorative panel has the same surface properties as the substrate having the undercoat layer formed thereon, and this method of manufacture is particularly suitable for a decorative panel having a high-gloss, mirror-like flat surface.

A repair structure of a seventh aspect of the present invention is a repair structure including a decorative panel repaired with a repair seal. The decorative panel includes at least one undercoat layer, a colored layer, and a clear layer stacked in this order on a substrate. The decorative panel has, in a surface thereof, a recess from which at least the clear layer has been removed. The repair seal is attached to the decorative panel so as to cover the recess. The repair seal is composed of a repair multilayer body including a transparent or translucent resin base material sheet, a repair colored layer disposed on a front side of the base material sheet and formed from the same paint as the colored layer, and a repair clear layer disposed on a front side of the repair colored layer and formed from the same paint as the clear layer; and a transparent or translucent adhesive layer disposed on a back side of the base material sheet.

The repair structure of the seventh aspect has the advantages described in the context of the repair seal of the first aspect. If there is a recess such as a scratch in the surface of the decorative panel, the recess can be repaired so that the repaired area is not noticeable.

As an eighth aspect of the present invention, the recess may be a screw hole for driving a screw into the decorative panel. The screw has a screw head disposed within the substrate. The repair seal is preferably attached to the screw hole over an area of 2 to 10 times the cross-sectional area of the screw hole. In this case, the screw hole, which is formed when the decorative panel is secured with the screw, is not noticeable. In particular, when there is a screw hole in the decorative panel and the screw hole is repaired, the repair seal is resistant to cracking and peeling even if an empty space remains between the repair coating body and the screw head because the screw hole is not filled with putty or is insufficiently filled with putty.

Advantageous Effects of Invention

The repair seal of the present invention is resistant to cracking and peeling during an attachment procedure and is not noticeable after repair. In addition, the repair seal of the present invention can be manufactured by the method of manufacture of the present invention. Furthermore, the repair seal of the repair structure of the present invention is resistant to cracking and peeling during an attachment procedure and is not noticeable after repair.

DESCRIPTION OF EMBODIMENTS

An embodiment of the present invention will hereinafter be described.

Figure 1:
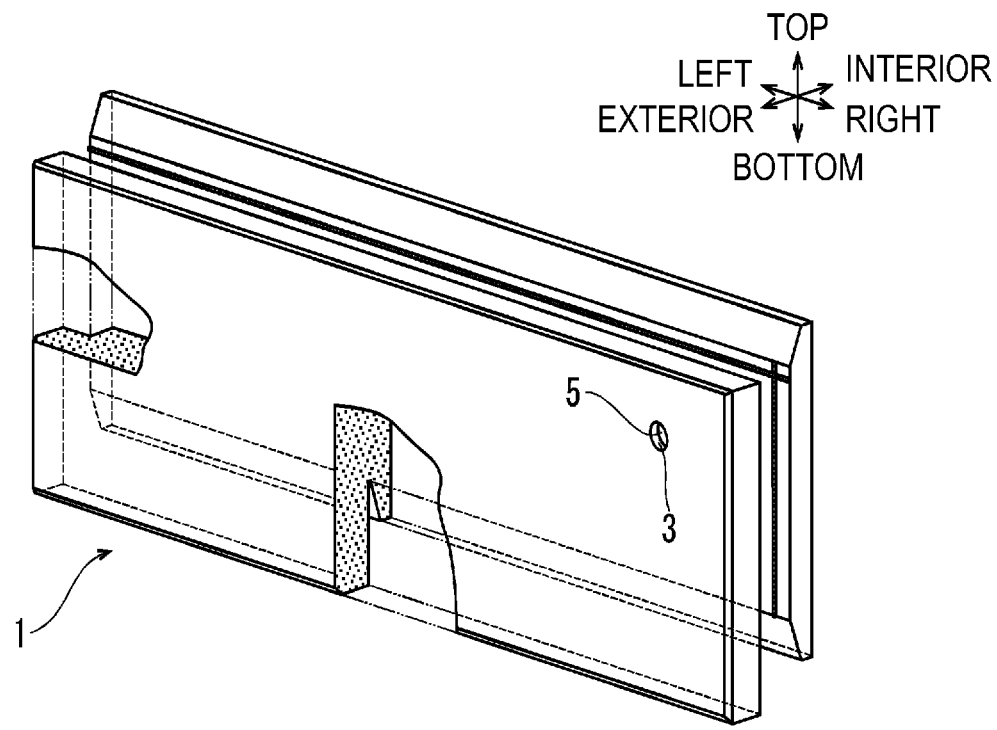
FIG. 1 is a partially cutaway perspective view of a decorative panel according to an embodiment.

In this embodiment, a decorative panel 1 for building shown in FIG. 1 is used. A plurality of decorative panels 1 are arranged adjacent to each other on a structure such as a building to form an exterior wall or other member.

The decorative panel of this embodiment is not limited to exterior wall panels. Rather, various decorative panels such as interior wall panels can be applied.

The decorative panel 1 of this embodiment has a high-gloss, mirror-like flat surface with a gloss value of 80 to 100. The shape of the decorative panel 1, however, is not limited to a high-gloss surface or a flat surface. Rather, any desired gloss value and shape can be employed.

Figure 2:
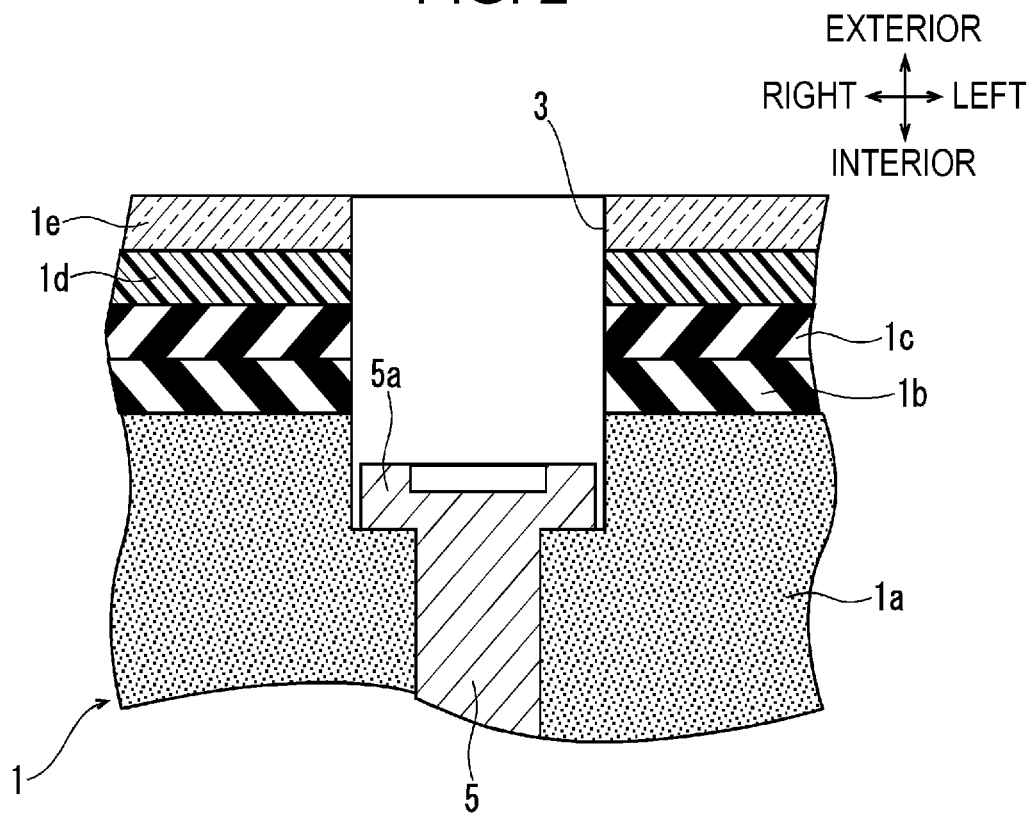
FIG. 2 is a schematic enlarged sectional view of the decorative panel according to the embodiment.

As shown in FIG. 2, the decorative panel 1 includes coating layers formed on a ceramic substrate 1a. The coating layers include, in order from the substrate 1a side, a first undercoat layer 1b, a second undercoat layer 1c, a colored layer 1d, and a clear layer 1e. All of the first undercoat layer 1b, the second undercoat layer 1c, the colored layer 1d, and the clear layer 1e are layers formed from paints.

The first undercoat layer 1b is a layer for ensuring sufficient adhesion between the substrate 1a and the undercoat layer 1c, and the paint is selected depending on the composition and shape of the decorative panel 1. Examples of types of paints used for the first undercoat layer 1b include, but not limited to, urethane-based, acrylic-based, and epoxy-based paints. The undercoat layer 1b in this embodiment are formed from urethane-based paints containing no pigment. The use of urethane resin-based paints is preferred since they can permeate into the surface layer of the substrate 1a and enhance the strength of the substrate surface.

The second undercoat layer 1c is a layer serving as a base for the decorative panel 1 to achieve the desired appearance, for example, in terms of smoothness and color, and the paint is selected depending on the desired appearance of the decorative panel 1. Examples of types of paints used for the second undercoat layer 1c include, but not limited to, urethane-based, acrylic-based, and epoxy-based paints. In this embodiment, the second undercoat layer 1c is formed from an acrylic-based paint. The use of acrylic-based paints is preferred since a smooth coating appearance can be easily achieved.

The thickness and color of the first undercoat layer 1b and the second undercoat layer 1c are not limited as long as the desired color and appearance of the decorative panel 1 can be achieved. In this embodiment, the first undercoat layer 1b has a thickness of about 0.005 to about 0.1 mm, and the second undercoat layer 1c has a thickness of about 0.01 to about 0.1 mm.

The colored layer 1d is a layer that most determines the color of the decorative panel 1, and the paint is selected depending on the color of the appearance of the decorative panel 1. Examples of types of paints used for the colored layer 1d include, but not limited to, acrylic-based, urethane-based, silicone-based, and fluorine-based paints. In this embodiment, the colored layer 1d is formed from an acrylic urethane-based paint. The use of acrylic urethane-based paints is preferred since a smooth appearance can be easily achieved.

Although the thickness of the colored layer 1d is not limited, the colored layer 1d in this embodiment has a thickness of about 0.01 to about 0.1 mm.

Examples of types of pigments and other materials added to the paint used for the colored layer 1d include, but not limited to, inorganic color pigments such as titanium oxide, red iron oxide, yellow iron oxide, carbon black, and cobalt blue; organic color pigments such as phthalocyanine blue, phthalocyanine green, and quinacridone red; extender pigments such as barium sulfate, talc, and calcium carbonate; and design materials such as aluminum paste, mica, silica, and resin beads. Of these, any material can be used as needed.

The paint used for the colored layer 1d is also used to form a repair colored layer 70b of a repair seal 7, described later.

The clear layer 1e is a layer that determines the gloss appearance and also functions to block ultraviolet radiation and protect the colored layer 1d. This clear layer 1e is a transparent or translucent layer, as with a repair clear layer 70c of the repair seal 7, described later. The clear layer 1e forms a high-gloss surface with a gloss value of 80 to 100 on the decorative panel 1. Examples of types of paints used for the clear layer 1e include, but not limited to, urethane-based, acrylic-based, silicone-based, and fluorine-based paints. In this embodiment, the clear layer 1e is formed from an acrylic urethane-based paint. The use of acrylic urethane-based paints is preferred since a hard coating can be easily obtained.

Although the thickness of the clear layer 1e is not limited, the clear layer 1e in this embodiment has a thickness of about 0.01 to about 0.1 mm.

As the paints used for the undercoat layers 1b and 1c, the colored layer 1d, and the clear layer 1e, paints that provide the desired appearance and physical properties are selected, including water-based, solvent-based, and solvent-free paints.

In addition, additives such as dispersants, surface modifiers, defoamers, thickeners, light stabilizers, and ultraviolet absorbers can optionally be added to the paints.

Although the coating layers in this embodiment include the above four layers, the decorative panel 1 is not limited thereto, but may optionally include another coating layer. In addition, the undercoat layers 1b and 1c may be composed of a single layer.

The decorative panel 1 has a screw hole 3 formed therethrough for securing to a structure and a screw 5 driven into the screw hole 3. The screw 5 has its screw head 5a located within the substrate 1a. Accordingly, as shown in FIGS. 3 and 4, the opening of the screw hole 3 is repaired with the repair seal 7.

Figure 3:
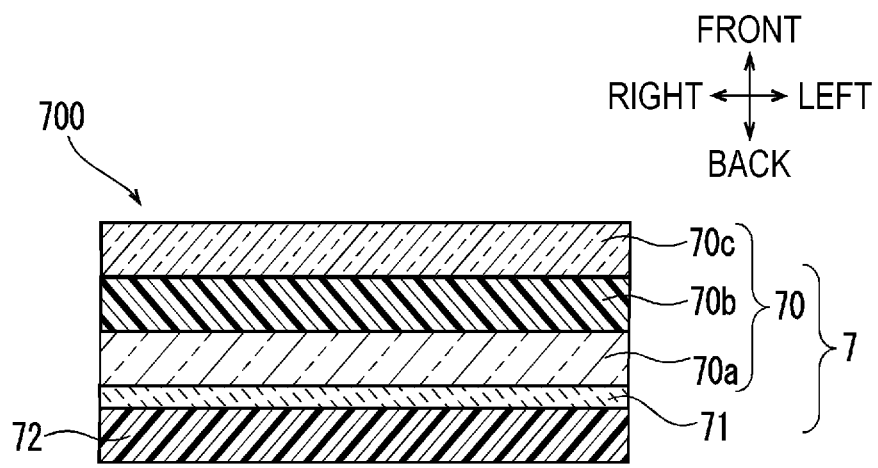
FIG. 3 is a schematic enlarged sectional view of a repair seal of the embodiment.
Figure 4:
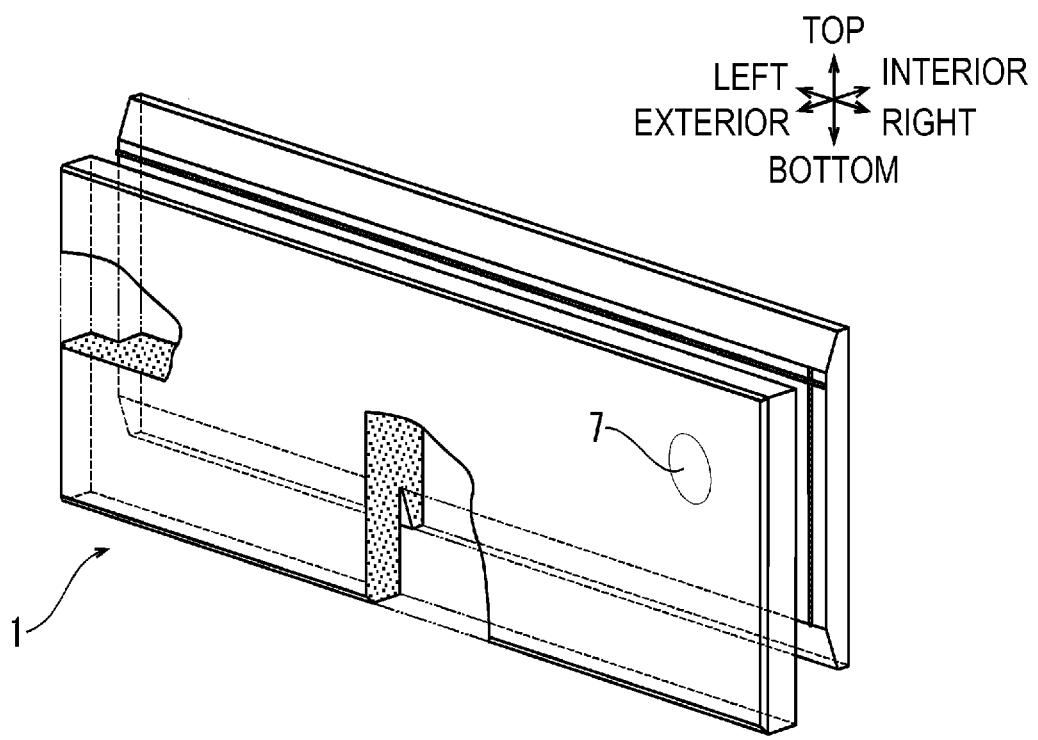
FIG. 4 is a partially cutaway perspective view of a repair structure of the embodiment.

As shown in FIG. 3, the repair seal 7 is composed of a repair multilayer body 70 and an adhesive layer 71.

The repair multilayer body 70 is composed of a base material sheet 70a, a repair colored layer 70b disposed on the front surface of the base material sheet 70a, and a repair clear layer 70c disposed on the front surface of the repair colored layer 70b.

The repair clear layer 70c only needs to be formed on the front side of the repair colored layer 70b, and a layer such as another coating layer may be disposed between the repair clear layer 70c and the repair colored layer 70b.

Figure 10:
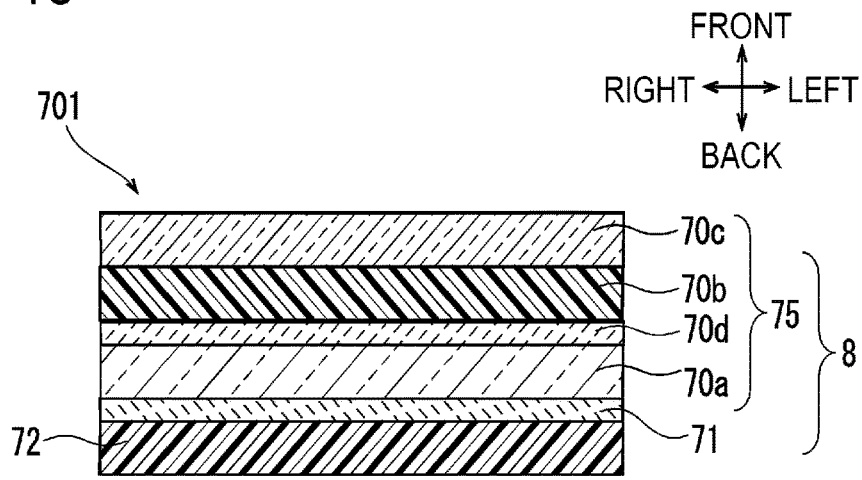
FIG. 10 is a schematic enlarged sectional view of a repair seal of the embodiment including a primer layer.

In addition, as shown in FIG. 10 described later, as with a repair seal 8, the repair seal 7 may include a primer layer 70d that is transparent, translucent, or of the same color as the colored layer between the base material sheet 70a and the repair colored layer 70b.

The base material sheet 70a is a transparent or translucent resin sheet. Examples of types of resins used include, but not limited to, polyimides and polyesters. In this embodiment, transparent gold to reddish-brown aromatic polyimide resins are preferred. The use of aromatic polyimide resins is preferred in terms of thermal resistance and dimensional stability.

Although the thickness of the base material sheet 70a is not limited as long as the repair seal 7 is not noticeable when the repair seal 7 is attached to the decorative panel 1, the thickness of the base material sheet 70a is preferably set to be substantially equal to the thickness of the clear layer 1e of the decorative panel 1. In this embodiment, the base material sheet 70a has a thickness of about 0.01 to about 0.2 mm. If the base material sheet 70a has a thickness of less than 0.01 mm, creases form easily in the coating surface after coating and drying. If the base material sheet 70a has a thickness of more than 0.2 mm, the projection from the decorative panel due to the thickness of the repair seal is noticeable. If the thickness falls within this range, the projection of the repair seal from the decorative panel is almost unnoticeable.

The repair colored layer 70b is a coating layer formed from the same paint as the colored layer 1d of the decorative panel 1 to which the repair seal 7 is to be attached. Here, "the same paint" only needs to have the same composition and need not have exactly the same color as the colored layer 1d of the decorative panel 1. The color of the appearance of the decorative panel 1 may differ from its original color, for example, after aging; therefore, it may be preferred to adjust the color of the repair colored layer 70b to the color after aging. Thus, the color of the repair colored layer 70b is not necessarily identical to the actual color of the colored layer 1d of the as-manufactured decorative panel 1 to which the repair seal is to be attached before aging.

Although the thickness of the repair colored layer 70b is not limited as long as the repair seal 7 is not noticeable when the repair seal 7 is attached to the decorative panel 1, the thickness of the repair colored layer 70b is preferably set to be substantially equal to the thickness of the colored layer 1d of the decorative panel 1. In this embodiment, the repair colored layer 70b has a thickness of about 0.01 to about 0.1 mm.

The repair clear layer 70c is a transparent or translucent coating layer formed from the same paint as the clear layer 1e of the decorative panel 1 to which the repair seal 7 is to be attached. Here, as in the case of the repair colored layer 70b described above, "the same paint" only needs to have the same composition and need not have exactly the same color as the clear layer 1e of the decorative panel 1. That is, a transparent or translucent color is selected as the color of the repair clear layer 70c so as to match the color of the decorative panel 1 to which the repair seal 7 is to be attached, and the color of the repair clear layer 70c is not necessarily identical to the color of the clear layer 1e of the as-manufactured decorative panel 1.

Although the thickness of the repair clear layer 70c is not limited as long as the repair seal 7 is not noticeable when the repair seal 7 is attached to the decorative panel 1, the thickness of the repair clear layer 70c is preferably set to be substantially equal to the thickness of the clear layer 1e of the decorative panel 1. In this embodiment, the repair clear layer 70c has a thickness of about 0.01 to about 0.1 mm.

The adhesive layer 71 is a transparent or translucent layer formed on a release sheet 72. That is, the adhesive layer 71 is located on the back side of the base material sheet 70a of the repair multilayer body 70 and is formed on the side of the base material sheet 70a opposite the side where the repair colored layer 70b is formed.

The adhesive layer 71 is a resin for attachment of the repair multilayer body 70 to the decorative panel 1. Examples of types of resins used include, but not limited to, silicone-based, acrylic-based, olefin-based, and epoxy-based resins. In this embodiment, the adhesive layer 71 is formed from a silicone-based resin. The use of silicone-based resins is preferred since the bonding strength thereof is less likely to decrease after heating.

Although the thickness of the adhesive layer 71 is not limited as long as the repair seal 7 is not noticeable when the repair seal 7 is attached to the decorative panel 1, the adhesive layer 71 in this embodiment has a thickness of about 0.01 to about 0.1 mm.

The release sheet 72 is a sheet that can be removed from the adhesive layer 71. When attaching the repair seal 7 to the decorative panel 1, the operator removes the repair seal 7 from the release sheet 72 and attaches the repair multilayer body 70 to the decorative panel 1 with the adhesive layer 71 therebetween.

The release sheet 72 is, for example, a polyolefin-based, polyester-based, or polyimide-based resin sheet or such a resin sheet coated with a release agent.

If the primer layer 70d shown in FIG. 10 is disposed between the base material sheet 70a and the repair colored layer 70b, a paint that can be used to obtain a layer that is transparent, translucent, or of the same color as the repair colored layer 70b is used for the primer layer 70d.

This primer layer 70d is a coating layer for improving the adhesion between the base material sheet 70a and the repair colored layer 70b.

Examples of types of paints for forming this primer layer 70d include, but not limited to, silicone-based, acrylic-based, urethane-based, and epoxy-based paints. In this embodiment, the primer layer 70d is formed from an epoxy-based resin. Epoxy-based resins are preferred since they have a superior effect of improving the adhesion.

The combination of the repair seal 7 and the release sheet 72 is hereinafter referred to as a repair seal member 700 (or 701 if it includes the primer layer 70d in FIG. 10).

Figure 5:
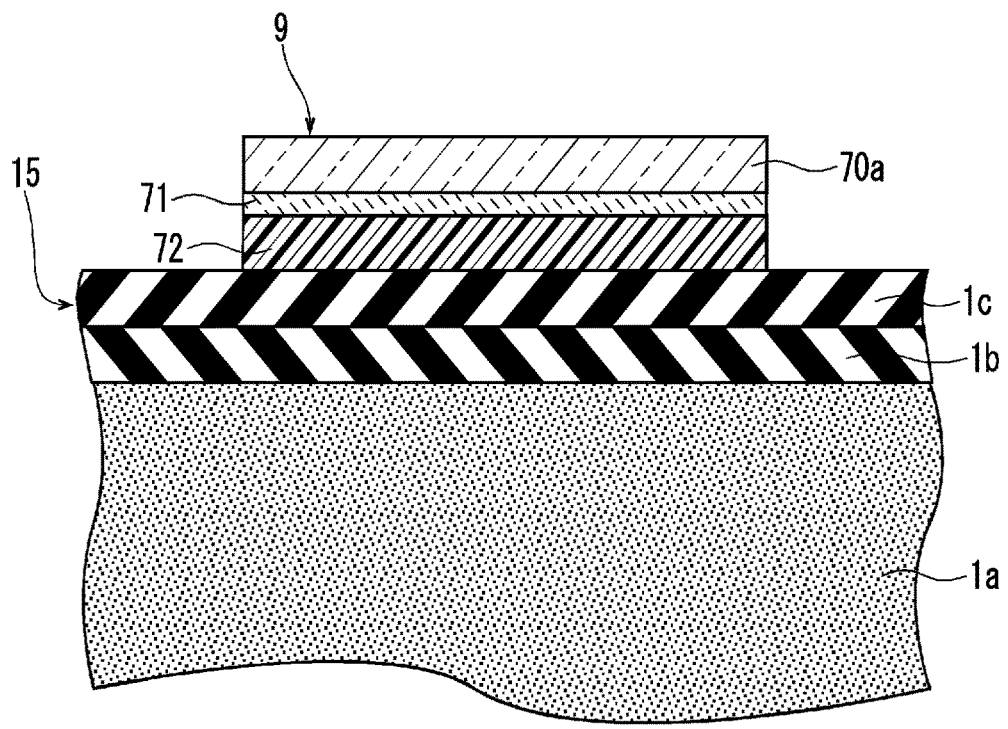
FIG. 5 is a schematic enlarged sectional view in first and second providing steps of a method for manufacturing the repair seal of the embodiment.

A method for manufacturing the repair seal member 700 is shown below. First, as a first providing step, as shown in FIG. 5, an intermediate sheet 9 is provided. The intermediate sheet 9 is composed of the base material sheet 70a, the adhesive layer 71 disposed on the back surface of the base material sheet 70a, and the release sheet 72 disposed on the back surface of the adhesive layer 71. As described above, the intermediate sheet 9 may include the primer layer 70d on the front surface of the base material sheet 70a.

As a second providing step, a first panel 15 serving as a base panel is provided. The first panel 15 is composed of the substrate 1a and the first and second undercoat layers 1b and 1c disposed on the substrate 1a. The intermediate sheet 9 is then placed with the release sheet 72 facing the front side of the first panel 15. The intermediate sheet 9 is secured to the first panel 15 with a tape or other material that is attachable to and detachable from the base material sheet 70a.

Figure 6:
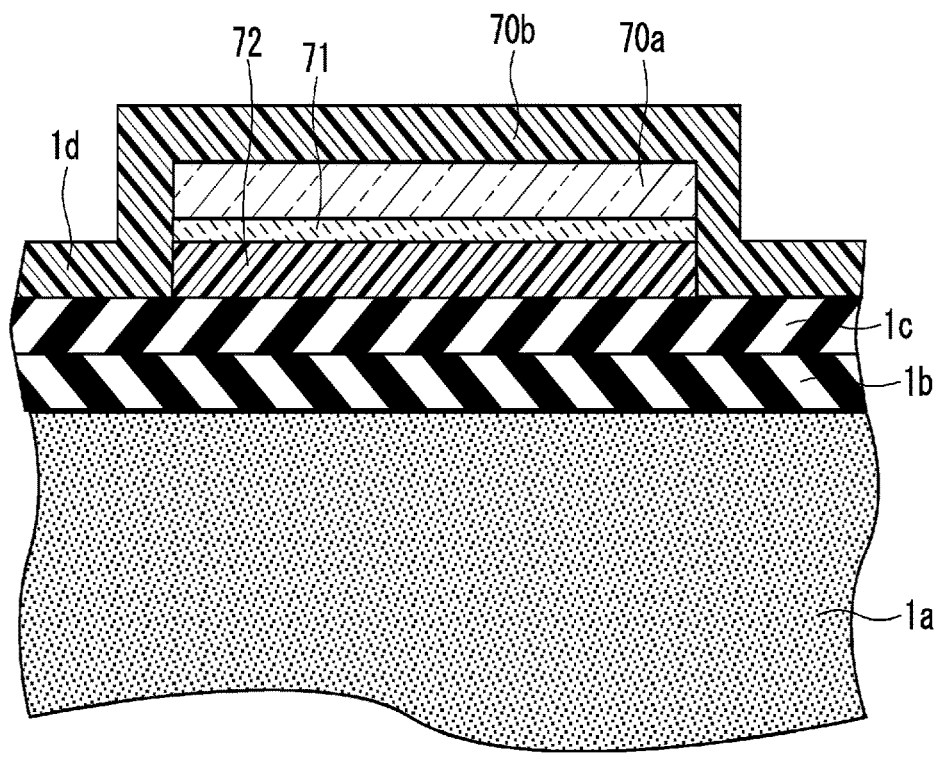
FIG. 6 is a schematic enlarged sectional view in a first coating step of the method for manufacturing the repair seal of the embodiment.

As a first coating step, as shown in FIG. 6, a solvent-based two-component acrylic urethane paint is applied to the first panel 15 and the intermediate sheet 9 and is then forcedly dried by heating. Thus, the colored layer 1d is formed on the first panel 15, and the repair colored layer 70b is formed on the base material sheet 70a. The colored layer 1d and the repair colored layer 70b are formed from the same paint.

Here, "the same paint" means the same composition and the same color. That is, in the first coating step, the color of the repair colored layer 70b is selected so that the repair seal 7 has the desired color and appearance, and the colored layer 1d is also formed from that paint.

Figure 7:
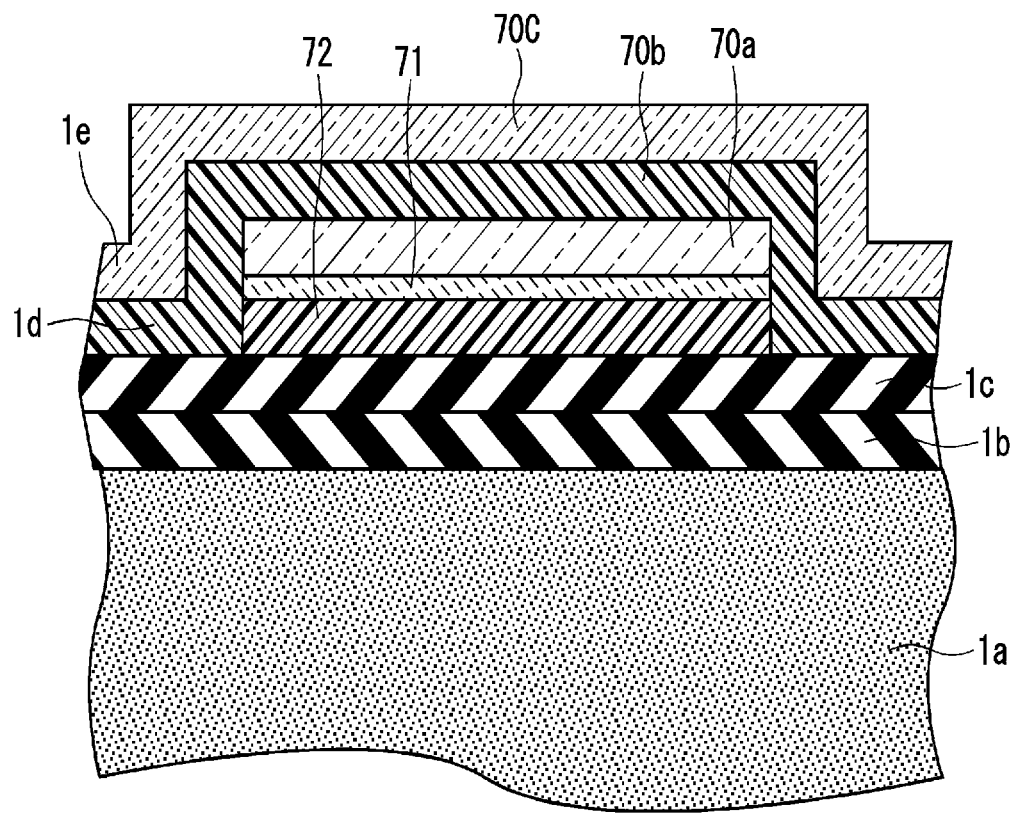
FIG. 7 is a schematic enlarged sectional view in a second coating step of the method for manufacturing the repair seal of the embodiment.

As a second coating step, as shown in FIG. 7, a solvent-based two-component acrylic urethane clear paint is further applied to the surfaces of the colored layer 1d and the repair colored layer 70b and is then forcedly dried by heating. Thus, the clear layer 1e is formed on the colored layer 1d, and the repair clear layer 70c is formed on the repair colored layer 70b. The clear layer 1e and the repair clear layer 70c are formed from the same paint.

Here, "the same paint" means the same composition and the same color and appearance. That is, in the second coating step, the color and appearance of the repair clear layer 70c are selected so that the repair seal 7 has the desired color and appearance, and the clear layer 1e is also formed from that paint.

Figure 8:
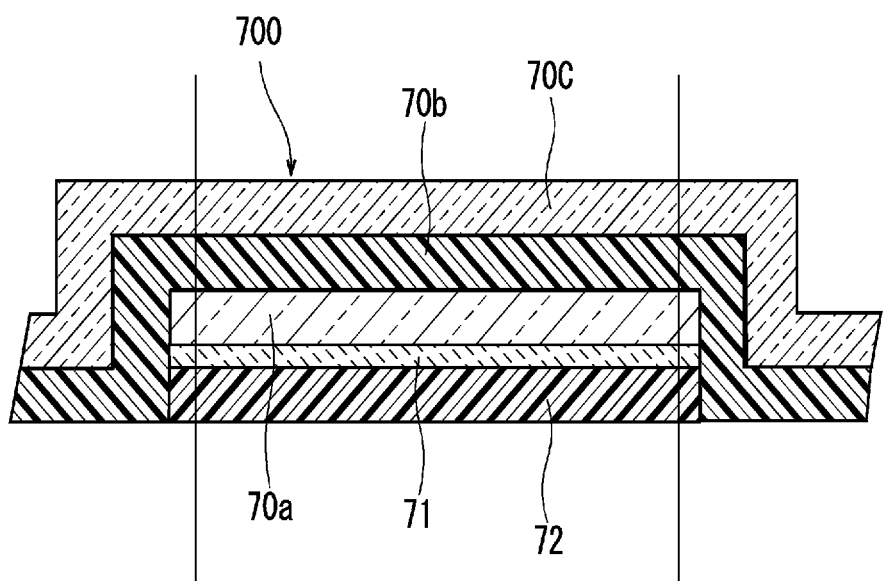
FIG. 8 is a schematic enlarged sectional view in a cutting step of the method for manufacturing the repair seal of the embodiment.

Thereafter, as indicated by the thin lines in FIG. 8, as a cutting step, the repair seal member 700 is removed from the first panel 15 and is cut to the desired size. In this way, the repair seal member 700 is easily manufactured.

For the repair seal 8 including the primer layer 70d shown in FIG. 10, the repair seal member 701 described above is manufactured using an intermediate sheet including the primer layer 70d formed on the front surface of the base material sheet 70a of the intermediate sheet by applying an epoxy resin-based paint.

Because the repair seal member 700 is manufactured using the same paints as for the colored layer 1d and the clear layer 1e of the decorative panel 1 in this method of manufacture, the colored layer 1d and the repair colored layer 70b are of the same color, and the clear layer 1e and the repair clear layer 70c are of the same color.

In this case, the color difference between the repair seal and the decorative panel to which the repair seal is attached is not noticeable if $\Delta E^*$ is 3 or less. Preferably, $\Delta E^*$ is 2 or less, more preferably 1 or less. In such cases, the color difference is not noticeable when the repair seal is visually observed.

In addition, because the repair seal member 700 is manufactured by placing the intermediate sheet 9 on the first panel 15 with the release sheet 72 facing the front side of the first panel 15 in this method of manufacture, the repair seal member 700 is affected by the surface properties of the first panel 15, that is, the surface profile of the first panel 15 that can be visually recognized. Thus, an appearance whose gloss and profile are similar to those of the decorative panel 1 can be achieved.

In particular, an appearance similar to that of the decorative panel 1 can be easily achieved if the repair colored layer 70b and the clear layer 70c are formed using a coater that contacts the intermediate sheet 9, such as a roll coater.

Figure 11:
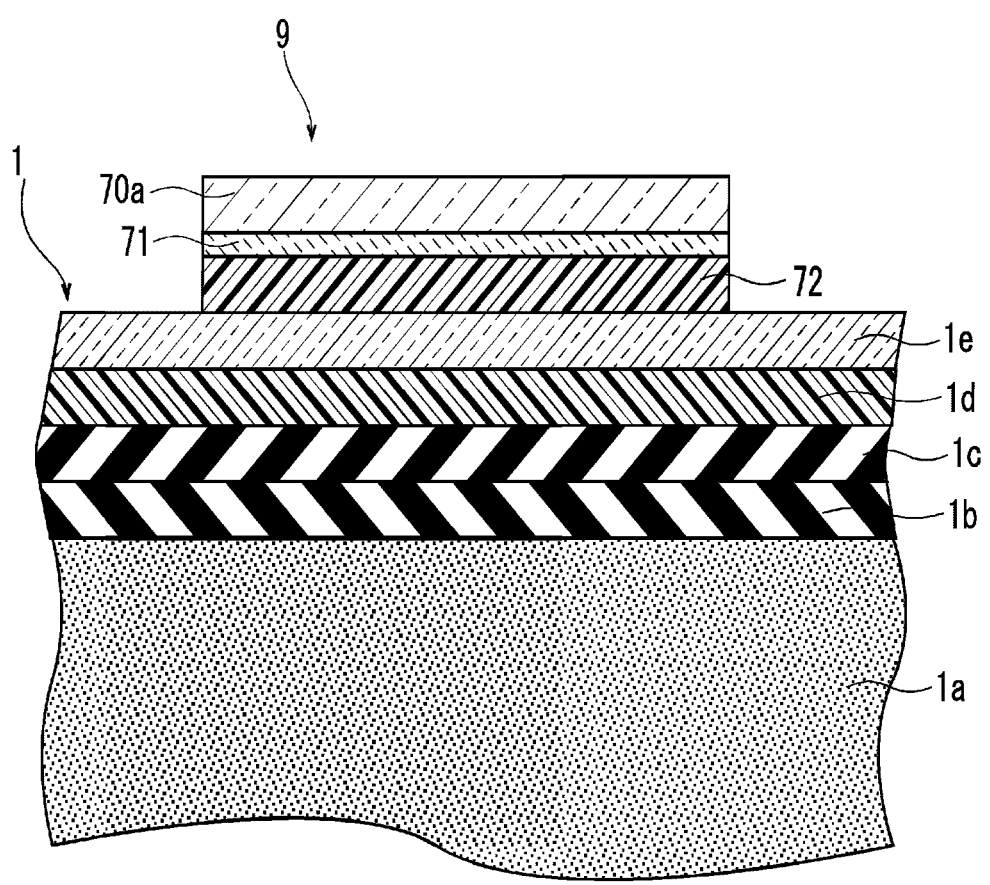
FIG. 11 is a schematic enlarged sectional view in first and second providing steps of a method for manufacturing the repair seal of the embodiment in which a decorative panel is used as a base panel.

As shown in FIG. 11, the intermediate sheet 9 can also be manufactured by the method for manufacturing the repair seal 7 described above using the decorative panel 1 as a base panel having the same surface properties as the substrate 1a coated with the undercoat layers 1b and 1c.

Figure 9:
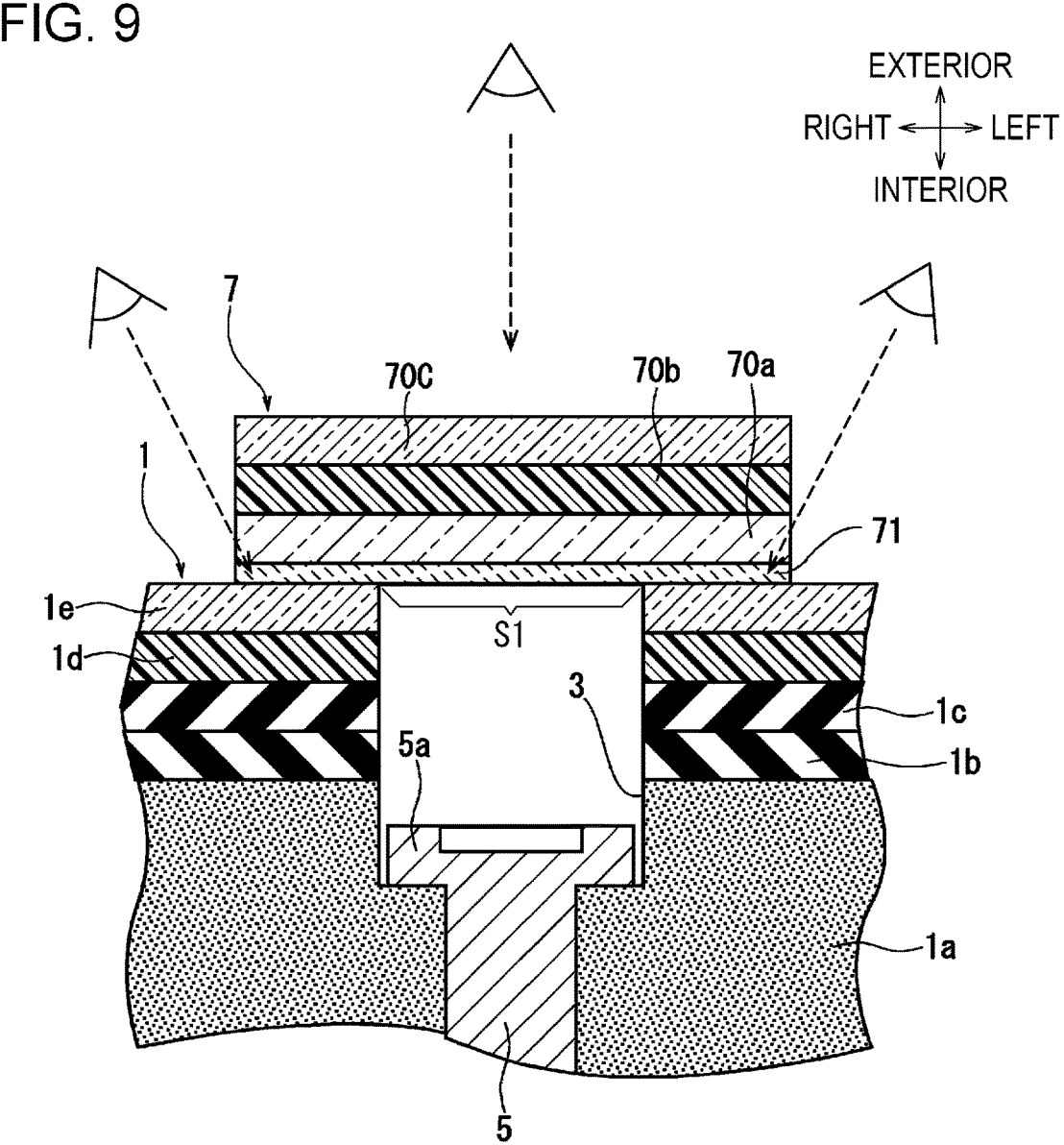
FIG. 9 is a schematic enlarged sectional view of the repair structure of the embodiment.

When the repair seal member 700 manufactured by the foregoing method of manufacture is used to repair the screw hole 3 in the surface of the actual decorative panel 1, as shown in FIGS. 4 and 9, the release sheet 72 is removed from the repair seal member 700, and the repair seal 7 is attached to the clear layer 1e of the decorative panel 1 so that they are in close contact with each other. In this way, a repair structure in which the screw hole 3 of the decorative panel 1 is hidden by the repair seal 7 is obtained.

The screw hole 3 is formed so as to match the size of the screw head 5a of the screw 5 used to secure the decorative panel 1. Thus, the size of the screw hole 3 is not limited. In this embodiment, the screw hole 3 has a diameter of 5 to 25 mm.

The repair seal 7 preferably has a size of 2 to 10 times the cross-sectional area S1 of the screw hole 3.

In this embodiment, the repair seal 7 has a circular shape with a diameter of 10 to 50 mm, and the repair seal 7 has an area of 2 to 10 times the cross-sectional area S1 of the screw hole 3.

If the repair seal 7 is smaller than twice the cross-sectional area S1 of the screw hole 3, the repair seal 7 has a lower bonding strength to the decorative panel and is therefore more likely to peel from the ends of the repair seal 7. If the repair seal 7 has a size of more than 10 times the cross-sectional area S1 of the screw hole 3, the repaired area is more noticeable.

EXAMPLES AND COMPARATIVE EXAMPLES

Examples of the embodiment and comparative examples are shown in Tables 1 to 3.

In Examples 1 to 5 in Table 1 and Comparative Examples 1 to 5, test specimens were prepared as follows. The first panel 15 was used as a base panel. The repair colored layer was formed by spray coating with a dark-blue solvent-based two-component acrylic urethane paint. The repair clear layer was formed by air spray coating with a transparent solvent-based two-component acrylic urethane paint.

In Examples 6 and 7 and Comparative Example 6 in Table 3, the decorative panel 1 was used as a base panel. The repair colored layer was formed by applying a white solvent-based two-component acrylic urethane paint using a roll coater and a flow coater. The repair clear layer was formed by applying a transparent solvent-based two-component acrylic urethane paint using a flow coater.

TABLE 1

|  | Example 1 | Example 2 | Example 3 | Example 4 | Example 5 |
|---|---|---|---|---|---|
| Type of base material sheet | Polyimide | Polyimide | Polyimide | Polyester | Polyester |
| Thickness of base material sheet (mm) | 0.025 | 0.05 | 0.1 | 0.2 | 0.1 |
| Appearance of base material sheet | Transparent Yellowish red | Transparent Yellowish red | Transparent Colorless | Transparent Colorless | Transparent Colorless |
| Presence or absence/appearance of primer layer | Absent/— | Absent/— | Present/transparent | Present/transparent | Absent/— |
| Thickness of primer layer (mm) |  |  | 0.03 | 0.03 |  |
| Type of adhesive layer | Silicone-based | | | | |
| Thickness (mm) | 0.03 | | | | |
| Appearance of adhesive layer | Transparent Colorless | Transparent Colorless | Transparent Colorless | Transparent Colorless | Transparent Colorless |
| Thickness of repair colored layer (dark blue) (mm) | 0.05 | 0.05 | 0.04 | 0.08 | 0.04 |
| Thickness of repair clear layer (mm) | 0.05 | 0.05 | 0.04 | 0.04 | 0.04 |
| Thickness of repair seal excluding release sheet (mm) | 0.155 | 0.18 | 0.24 | 0.38 | 0.21 |
| Condition of repair seal after coating and drying | No abnormal condition | No abnormal condition | No abnormal condition | No abnormal condition | No abnormal condition |
| Adhesion between base material sheet and repair colored layer | No peeling | No peeling | No peeling | No peeling | Slight peeling |
| Gloss | 90 | 90 | 85 | 85 | 82 |
| Color difference ΔE with respect to decorative panel | 1> | 1> | 1> | 1.5 | 1> |
| Presence or absence of cracks | Absent | Absent | Absent | Absent | Absent |
| Color of edges of side surfaces of repair seal | Good | Good | Good | Good | Good |
| Oblique observation | Good | Good | Good | Good | Fair |

TABLE 2

|  | Comparative Example 1 | Comparative Example 2 | Comparative Example 3 | Comparative Example 4 | Comparative Example 5 |
|---|---|---|---|---|---|
| Type of base material sheet | — | Paper | Polyester | Polyimide | Aluminum |
| Thickness of base material sheet (mm) |  | 0.1 | 0.2 | 0.025 | 0.05 |
| Appearance of base material sheet | — | Nontransparent White | Transparent Colorless | Transparent Yellowish red | Nontransparent Silver |
| Presence or absence/appearance of primer layer | Absent/— | Absent/— | Present/white | Present/white | Present/transparent |
| Thickness of primer layer (mm) |  |  | 0.03 | 0.03 | 0.03 |
| Type of adhesive layer | Silicone-based | | | | |
| Thickness (mm) | 0.03 | | | | |
| Appearance of adhesive layer | Nontransparent White | Transparent Colorless | Nontransparent White | Nontransparent White | Transparent Colorless |
| Thickness of repair colored layer (dark blue) (mm) | 0.05 | 0.06 | 0.05 | 0.05 | 0.05 |
| Thickness of repair clear layer (mm) | 0.05 | 0.05 | 0.04 | 0.055 | 0.05 |
| Thickness of repair seal excluding release sheet (mm) | 0.13 | 0.24 | 0.35 | 0.19 | 0.21 |
| Condition of repair seal after coating and drying | No abnormal condition | Creases formed | No abnormal condition | No abnormal condition | No abnormal condition |
| Adhesion between base material sheet and repair colored layer | — | No peeling | No peeling | No peeling | No peeling |
| Gloss | 80 | 45 | 80 | 87 | 85 |
| Color difference ΔE with respect to decorative panel | — | 5.5 | 1> | 1> | 1> |
| Presence or absence of cracks | Present | Absent | Absent | Absent | Absent |
| Color of edges of side surfaces of repair seal | Good | Good | Looked white | Looked white | Looked silver |
| Oblique observation | Poor | Poor | Poor | Poor | Fair |

TABLE 3

|  | Example 6 | Example 7 | Comparative Example 6 |
|---|---|---|---|
| Type of base material sheet | Polyimide | Polyimide | Aluminum |
| Thickness of base material sheet (mm) | 0.025 | 0.025 | 0.05 |
| Appearance of base material sheet | Transparent Yellowish red | Transparent Yellowish red | Nontransparent Silver |
| Presence or absence/appearance of primer layer | Absent/— | Present/white | Present/transparent |
| Thickness of primer layer (mm) |  | 0.03 |  |
| Type of adhesive layer | Silicone-based | | |
| Thickness (mm) | 0.03 | | |
| Appearance of adhesive layer | Transparent Colorless | Transparent Colorless | Transparent Colorless |
| Thickness of repair colored layer (white) (mm) | 0.035 | 0.035 | 0.035 |
| Thickness of repair clear layer (mm) | 0.025 | 0.025 | 0.025 |
| Thickness of repair seal excluding release sheet (mm) | 0.115 | 0.145 | 0.14 |
| Condition of repair seal after coating and drying | No abnormal condition | No abnormal condition | No abnormal condition |
| Adhesion between base material sheet and repair colored layer | No peeling | No peeling | No peeling |
| Gloss | 88 | 88 | 86 |
| Color difference ΔE with respect to decorative panel | 1> | 1> | 1> |
| Presence or absence of cracks | Absent | Absent | Absent |
| Color of edges of side surfaces of repair seal | Good | Good | Silver |
| Oblique observation | Good | Good | Fair |

Example 1

A repair seal member 700 of Example 1 was manufactured by the method of manufacture of the embodiment. During this process, as shown in FIG. 5 and Table 1, an intermediate sheet 9 was placed on a first panel 15 composed of three layers, namely, a substrate 1*a* and an undercoat layer 1*b* and an undercoat layer 1*c*. The intermediate sheet 9 was composed of a yellowish-brown polyimide base material sheet 70*a* with a thickness of 0.025 mm, a colorless transparent silicone-based adhesive layer 71 with a thickness of 0.03 mm, and a release sheet 72.

As shown in FIG. 6, the dark-blue paint for the colored layer 1*d* and the repair colored layer 70*b* was applied to these at 150 g/m² to obtain an average thickness of 0.05 mm. As shown in FIG. 7, the paint for the clear layer 1*e* and the repair clear layer 70*c* was further applied thereto at 130 g/m² to obtain an average thickness of 0.05 mm. The thus-obtained repair seal 7 had a thickness of 0.155 mm. There was no abnormal condition in the repair seal member 700 after coating and drying.

As shown in FIG. 9, the decorative panel 1 was repaired with this repair seal 7. The adhesion between the base material sheet 70*a* and the repair colored layer 70*b* was then evaluated. This evaluation was performed by making an X-cut only in the repair seal 7 from the repair clear layer 70*c* side, attaching Cellotape (registered trademark) at that position and then removing the Cellotape (registered trademark), and checking whether the repair colored layer 70*b* peeled or not. As a result, there was no peeling between the base material sheet 70*a* and the repair colored layer 70*b*.

In addition, when the gloss value of the surfaces of the decorative panel 1 and the repair seal 7 was measured with a "Gloss Checker IG-320" handy gloss meter available from Horiba, Ltd., the decorative panel 1 and the repair seal 7 had a high-gloss, mirror-like flat surface with a gloss value of 90.

When the color difference ΔE* between the decorative panel 1 and the repair seal 7 was measured, the color difference ΔE* was less than 1.

The color difference ΔE* was measured with a CM-600d spectrophotometer available from Konica Minolta, Inc. The color difference measurement conditions were as follows: measurement diameter: 8 mm; field of view: 10°; light source: D65; mode: SCI.

A repair seal 7 with a diameter of 20 mm was attached to a screw hole 3 with a diameter of 11 mm and was checked for workability and appearance. The area of the repair seal 7 was 3.3 times the screw hole cross-sectional area S1.

The repair multilayer body 70 did not crack during or after the attachment procedure. The repaired area was also checked from the front at a position 3 m away from the front side of the repair seal 7 and was obliquely observed from the left and the right and from the top and the bottom at positions inclined with respect to the front side. In the observation from the front and the oblique observation, the color of the repair seal 7 matched that of the decorative panel 1, and the edges of the side surfaces of the repair seal 7 were not noticeable. These results are also shown in Table 1.

Thus, because the repair multilayer body 70 of Example 1 includes the flexible base material sheet 70*a*, the repair multilayer body 70 does not crack during or after an attachment procedure, and the repair multilayer body 70 is resistant to peeling from the decorative panel 1.

In addition, because the base material sheet 70*a* of the repair seal 7 located on the decorative panel 1 side of the repair colored layer 70*b*, which is visible from the front side, is transparent, and the adhesive layer 71 is also transparent, the base material sheet 70*a* and the adhesive layer 71 are not easily visible at the edges of the repair multilayer body 70. In particular, because the color of the colored layer 1*d* is visible through the base material sheet 70*a* and the adhesive layer 71 when obliquely observed as shown in FIG. 9, and therefore the side surfaces of the repair seal 7 are less noticeable, the repaired area is not noticeable.

Thus, this repair seal 7 is resistant to cracking and peeling during or after an attachment procedure and is not noticeable after repair.

Example 2

A repair seal 7 of Example 2 was manufactured by the method of manufacture of the embodiment. As shown in Table 1, the polyimide base material sheet 70a had a thickness of 0.05 mm. The rest of the configuration is similar to that of the repair seal 7 of Example 1. This repair seal 7 was manufactured in the same manner as in Example 1. The resulting repair seal 7 had a thickness of 0.18 mm. There was no abnormal condition in the repair seal member 700 after coating and drying.

The repair seal 7 of Example 2 was used to obtain a repair structure similar to that of Example 1. The repair seal 7 had a high-gloss, mirror-like flat surface with a gloss value of 90. The results for the repair seal 7 of Example 2 are also shown in Table 1. Other advantageous effects are similar to those of Example 1.

Example 3

A repair seal member 701 of Example 3 as shown in FIG. 10 was manufactured by the method of manufacture of the embodiment. This repair seal members 701 included the primer layer 70d between the base material sheet 70a and the repair colored layer 70b.

This primer layer 70d was applied in advance to the front side of the base material sheet 70a of the intermediate sheet 9. The rest of the method of manufacture is similar to that of Example 1. In addition, the release sheet 72 was removed from the repair seal member 701, and the repair seal 8 was attached to the clear layer 1e of the decorative panel 1 so that they were in close contact with each other. In this way, a repair structure of the embodiment can be obtained. In the embodiment, the same elements are denoted by the same reference signs for brevity of description.

As shown in Table 1, a colorless transparent polyester base material sheet 70a with a thickness of 0.1 mm was used for the repair seal 8 of Example 3. In addition, the primer layer 70d was a transparent epoxy resin-based paint with a thickness of 0.03 mm. The repair colored layer 70b had a thickness of 0.04 mm, and the repair clear layer 70c had a thickness of 0.04 mm. The thus-obtained repair seal 8 had a thickness of 0.24 mm. There was no abnormal condition in the repair seal member 701 after coating and drying.

The repair seal 8 of Example 3 was used to obtain a repair structure similar to that of Example 1. The repair seal 8 had a high-gloss, mirror-like flat surface with a gloss value of 85. The results for the repair seal 8 of Example 3 are also shown in Table 1.

Because this repair seal 8 included the transparent primer layer 70d between the base material sheet 70a and the repair colored layer 70b, the adhesion between the base material sheet 70a and the repair colored layer 70b was improved. Other advantageous effects are similar to those of Example 1.

Example 4

A repair seal 8 of Example 4 was manufactured by the method of manufacture of the embodiment. During this process, as shown in Table 1, a colorless transparent polyester base material sheet 70a with a thickness of 0.2 mm was used. In addition, the primer layer 70d was an epoxy resin-based paint with a thickness of 0.03 mm. The repair colored layer 70b had a thickness of 0.08 mm, and the repair clear layer 70c had a thickness of 0.04 mm. The thus-obtained repair seal 8 had a thickness of 0.38 mm. There was no abnormal condition in the repair seal member 701 after coating and drying.

The repair seal 8 of Example 4 was used to obtain a repair structure similar to that of Example 1. The repair seal 8 had a high-gloss, mirror-like flat surface with a gloss value of 85. The color difference ΔE with respect to the decorative panel 1 was 1.5. The results for the repair seal 8 of Example 4 are also shown in Table 1. Other advantageous effects are similar to those of Example 2.

Example 5

A repair seal 7 of Example 5 was manufactured by the method of manufacture of the embodiment. During this process, as shown in Table 1, a colorless transparent polyester base material sheet 70a with a thickness of 0.1 mm was used. The repair colored layer 70b had a thickness of 0.04 mm, and the repair clear layer 70c had a thickness of 0.04 mm. The rest of the configuration is similar to that of the repair seal 7 of Example 1. This repair seal 7 was manufactured in the same manner as in Example 1. The resulting repair seal 7 had a thickness of 0.21 mm. There was no abnormal condition in the repair seal member 700 after coating and drying.

The repair seal 7 of Example 5 was used to obtain a repair structure similar to that of Example 1. The repair seal 7 had a high-gloss, mirror-like flat surface with a gloss value of 82. The results for the repair seal 7 of Example 5 are also shown in Table 1. Other advantageous effects are similar to those of Example 1.

Comparative Example 1

As shown in Table 2, no base material sheet was used for a repair seal of Comparative Example 1. Instead of an intermediate sheet, a nontransparent polypropylene sheet from which a repair colored layer was removable was coated in the same manner as in Example 1. The coating was removed from the polypropylene sheet, and a nontransparent white silicone adhesive layer was applied to the repair colored coating side of the coating.

Because no base material sheet was used for this repair seal, the repair seal was difficult to attach to a decorative panel, and the repair multilayer body cracked. In addition, because a white nontransparent adhesive layer was used for this repair seal, the repaired area was noticeable when obliquely observed.

Comparative Example 2

As shown in Table 2, a paper nontransparent base material sheet was used for a repair seal of Comparative Example 2. The rest of the method of manufacture is similar to that of Example 1.

Because a paper base material sheet was used for this repair seal, creases formed after coating and drying, and the repair seal had a low gloss value, i.e., 45, and a color difference ΔE of 5.5. In addition, because the base material sheet of this repair seal was nontransparent, the repaired area was noticeable when obliquely observed.

Comparative Examples 3 and 4

As shown in Table 2, repair seals of Comparative Examples 3 and 4 had a white nontransparent adhesive layer. The rest of the method of manufacture is similar to that of Example 1 to 5.

Because these repair seals had a dark-blue repair colored layer and a white nontransparent adhesive layer, the white color of the adhesive layer was easily visible at the edges of the repair multilayer body, and the repaired area was noticeable when obliquely observed.

Comparative Example 5

As shown in Table 2, an aluminum nontransparent base material sheet was used for a repair seal of Comparative Example 5. The rest of the method of manufacture is similar to that of Example 1 to 5.

Because an aluminum base material sheet was used for this repair seal, the silver color of the base material sheet was easily visible at the edges of the repair multilayer body. In addition, the repaired area was slightly noticeable when obliquely observed.

Example 6

A repair seal 7 of Example 6 in Table 3 was manufactured by the method of manufacture of the embodiment. During this process, as shown in FIG. 11 and Table 3, an intermediate sheet 9 was placed on a decorative panel 1 serving as a base panel. The decorative panel 1 included a first undercoat layer 1b, a second undercoat layer 1c, a white colored layer 1d, and a clear layer 1e stacked in this order. The decorative panel 1 had the same surface properties as the first panel 15 of the embodiment.

In the method for manufacturing a repair seal member in FIGS. 6 to 8, a repair seal member was manufactured using the decorative panel 1 instead of the first panel 15.

The colored layer 1d and the repair colored layer 70b were formed by applying a white solvent-based two-component acrylic urethane paint at 90 g/m². In addition, the clear layer 1e and the repair clear layer 70c were formed by applying a transparent solvent-based two-component acrylic urethane clear paint at 80 g/m² using a flow coater. As in FIG. 8, the repair seal member 700 was removed from the decorative panel 1 and was cut to the desired size. In this way, the repair seal member 700 was manufactured.

As shown in Table 3, the polyimide base material sheet 70a of the repair seal 7 of Example 6 had a thickness of 0.025 mm. The white colored layer 1d and the white repair colored layer 70b had an average thickness of 0.035 mm. In addition, the clear layer 1e and the repair clear layer 70c had an average thickness of 0.025 mm. The resulting repair seal 7 had a thickness of 0.115 mm. There was no abnormal condition in the repair seal member 700 after coating and drying.

The repair seal 7 of Example 6 was used to obtain a repair structure similar to that of Example 1. The repair seal 7 had a high-gloss, mirror-like flat surface with a gloss value of 88. The results for the repair seal 7 of Example 6 are also shown in Table 3. Other advantageous effects are similar to those of Example 1.

Example 7

A repair seal 8 of Example 7 in Table 3 was manufactured by the method of manufacture of the embodiment as shown in FIG. 10. An intermediate sheet 9 was placed on a decorative panel 1 serving as a base panel, and a repair seal member 701 was manufactured. A white primer layer 70d of the same white color as the repair colored layer 70b was formed at an average thickness of 0.03 mm on the front side of the base material sheet 70a of the intermediate sheet 9 before the intermediate sheet 9 was placed on the decorative panel 1. The rest of the method of manufacture is similar to that of Example 6.

The repair seal 8 obtained in Example 7 had a thickness of 0.145 mm. There was no abnormal condition in the repair seal member 701 after coating and drying.

The repair seal 8 of Example 7 was used to obtain a repair structure similar to that of Example 1. The repair seal 8 had a high-gloss, mirror-like flat surface with a gloss value of 88. The results for the repair seal 8 of Example 7 are also shown in Table 3.

Because this repair seal 8 included the white primer layer 70d between the base material sheet 70a and the repair colored layer 70b, the adhesion between the base material sheet 70a and the repair colored layer 70b was improved. Other advantageous effects are similar to those of Example 7.

Comparative Example 6

An aluminum nontransparent base material sheet having a transparent primer layer was used for a repair seal of Comparative Example 6. The rest of the method of manufacture is similar to that of Example 5.

Because an aluminum base material sheet was used for this repair seal, the silver color of the base material sheet was easily visible at the edges of the repair multilayer body. In addition, the repaired area was slightly noticeable when obliquely observed.

Although the present invention has been described above with reference to Examples 1 to 7, the invention is not limited to Examples 1 to 7 above. It should be understood that modifications can be made as appropriate without departing the spirit of the invention.

For example, although a first panel 15 including an undercoat layer on a substrate is used as a base panel in the second providing step in Examples 1 to 7 above, a second panel including an undercoat layer and a colored layer stacked on a substrate and having the same surface properties as the first panel may also be used as a base panel.

REFERENCE SIGNS LIST

1a . . . substrate
1b, 1c . . . undercoat layer (1b . . . first undercoat layer, 1c . . . second undercoat layer)
1d . . . colored layer
1e . . . clear layer
1 . . . decorative panel, base panel
7, 8 . . . repair seal
70a . . . base material sheet
70b . . . repair colored layer
70c . . . repair clear layer
70d . . . primer layer
70 . . . repair multilayer body
72 . . . release sheet
71 . . . adhesive layer
9 . . . intermediate sheet
15 . . . first panel (base panel)
3 . . . screw hole, recess
5 . . . screw 5a ... screw head
S1 ... cross-sectional area of screw hole

The invention claimed is:

1. A repair seal that is used for a decorative panel including at least one undercoat layer, a colored layer, and a clear layer stacked in this order on a substrate, the repair seal comprising:
 a repair multilayer body including a transparent or translucent resin base material sheet, a repair colored layer disposed on a front side of the base material sheet and formed from the same paint as the colored layer, and a repair clear layer disposed on a front side of the repair colored layer and formed from the same paint as the clear layer; and
 a transparent or translucent adhesive layer disposed on a back side of the base material sheet,
 wherein the adhesive layer is formed from a silicone-based resin,
 wherein a color of the colored layer of the decorative panel is visible through the resin base material sheet and the adhesive layer, and
 wherein the base material sheet comprises an aromatic polyimide.

2. The repair seal according to claim 1, comprising a primer layer that is disposed between the base material sheet and the repair colored layer and that is transparent, translucent, or of the same color as the repair colored layer.

3. The repair seal according to claim 1, wherein the decorative panel has a high-gloss, mirror-like flat surface.

4. The repair seal according to claim 1, wherein the base material sheet has thickness of 0.01 mm to 0.2 mm.

5. The repair seal according to claim 1, wherein the silicone-based resin of the adhesive layer has a bonding strength, which is maintainable after heating, and
 the aromatic polyimide of the base material sheet has a heat resistance and a dimensional stability.

6. A method for manufacturing a repair seal that is used for a decorative panel including at least one undercoat layer, a colored layer, and a clear layer stacked in this order on a substrate, the method comprising:
 a first providing step of providing an intermediate sheet including a transparent or translucent resin base material sheet, a transparent or translucent adhesive layer disposed on a back side of the base material sheet, and a release sheet disposed on a back side of the adhesive layer;
 a second providing step of providing a base panel having the same surface properties as the substrate having the undercoat layer formed thereon;
 placing the intermediate sheet with the release sheet facing a front side of the base panel; and
 a coating step of applying the same paint as for the colored layer to the base material sheet to form a repair colored layer and then applying the same paint as for the clear layer to form a repair clear layer,
 wherein the adhesive layer is formed from a silicone-based resin,
 wherein a color of the colored layer of the decorative panel is visible through the resin base material sheet and the adhesive layer, and
 wherein the base material sheet comprises an aromatic polyimide.

7. The method for manufacturing a repair seal according to claim 6, wherein the base panel is the decorative panel.

8. The method for manufacturing a repair seal according to claim 6, wherein the base material sheet has thickness of 0.01 mm to 0.2 mm.

9. The method for manufacturing a repair seal according to claim 6, wherein the silicone-based resin of the adhesive layer has a bonding strength, which is maintainable after heating, and
 the aromatic polyimide of the base material sheet has a heat resistance and a dimensional stability.

10. A repair structure comprising a decorative panel repaired with a repair seal, the decorative panel including at least one undercoat layer, a colored layer, and a clear layer stacked in this order on a substrate,
 wherein the decorative panel has, in a surface thereof, a recess from which at least the clear layer has been removed,
 the repair seal is attached to the decorative panel so as to cover the recess, and
 the repair seal comprises:
 a repair multilayer body including a transparent or translucent resin base material sheet, a repair colored layer disposed on a front side of the base material sheet and formed from the same paint as the colored layer, and a repair clear layer disposed on a front side of the repair colored layer and formed from the same paint as the clear layer; and
 a transparent or translucent adhesive layer disposed on a back side of the base material sheet,
 wherein the adhesive layer is formed from a silicone-based resin,
 wherein a color of the colored layer of the decorative panel is visible through the resin base material sheet and the adhesive layer, and
 wherein the base material sheet comprises an aromatic polyimide.

11. The repair structure according to claim 10, wherein
 the recess is a screw hole for driving a screw into the decorative panel,
 the screw has a screw head disposed within the substrate, and
 the repair seal is attached to the screw hole over an area of 2 to 10 times a cross-sectional area of the screw hole.

12. The repair structure according to claim 10, wherein the base material sheet has thickness of 0.01 mm to 0.2 mm.

13. The repair structure according to claim 10, wherein the silicone-based resin of the adhesive layer has a bonding strength, which is maintainable after heating, and
 the aromatic polyimide of the base material sheet has a heat resistance and a dimensional stability.

* * * * *